United States Patent
Neil et al.

(12) 
(10) Patent No.: US 6,809,291 B1
(45) Date of Patent: Oct. 26, 2004

(54) PROCESS FOR LASER MACHINING AND SURFACE TREATMENT

(75) Inventors: George R. Neil, Williamsburg, VA (US); Michelle D. Shinn, Newport News, VA (US)

(73) Assignee: Southeastern Universities Research Assn., Inc., Newport News, VA (US)

( * ) Notice: Subject to any disclaimer, the term of this patent is extended or adjusted under 35 U.S.C. 154(b) by 232 days.

(21) Appl. No.: 10/231,580

(22) Filed: Aug. 30, 2002

(51) Int. Cl.[7] .............................................. B23K 26/36
(52) U.S. Cl. ............................. 219/121.76; 219/121.68
(58) Field of Search ......................... 219/121.6, 121.61, 219/121.65, 121.66, 121.67, 121.68, 121.69, 121.7, 121.71, 121.72, 121.76, 121.85

(56) References Cited

U.S. PATENT DOCUMENTS

| | | | |
|---|---|---|---|
| 5,720,894 A | * | 2/1998 | Neev et al. .................... 216/65 |
| 6,268,586 B1 | * | 7/2001 | Stuart et al. ............ 219/121.72 |
| 6,552,301 B2 | * | 4/2003 | Herman et al. ......... 219/121.71 |
| 6,555,781 B2 | * | 4/2003 | Ngoi et al. ............ 219/121.67 |

* cited by examiner

Primary Examiner—Samuel M. Reinrich

(57) ABSTRACT

An improved method and apparatus increasing the accuracy and reducing the time required to machine materials, surface treat materials, and allow better control of defects such as particulates in pulsed laser deposition. The speed and quality of machining is improved by combining an ultrashort pulsed laser at high average power with a continuous wave laser. The ultrashort pulsed laser provides an initial ultrashort pulse, on the order of several hundred femtoseconds, to stimulate an electron avalanche in the target material. Coincident with the ultrashort pulse or shortly after it, a pulse from a continuous wave laser is applied to the target. The micromachining method and apparatus creates an initial ultrashort laser pulse to ignite the ablation followed by a longer laser pulse to sustain and enlarge on the ablation effect launched in the initial pulse. The pulse pairs are repeated at a high pulse repetition frequency and as often as desired to produce the desired micromachining effect. The micromachining method enables a lower threshold for ablation, provides more deterministic damage, minimizes the heat affected zone, minimizes cracking or melting, and reduces the time involved to create the desired machining effect.

19 Claims, 1 Drawing Sheet

PROCESS FOR LASER MACHINING AND SURFACE TREATMENT

The United States of America may have certain rights to this invention under Management and Operating Contract No. DE-AC05-84ER-40150 from the Department of Energy.

FIELD OF THE INVENTION

The present invention relates to machining of materials, and more particularly to the precision machining of materials using lasers. The present invention improves the accuracy of laser machining of metal alloys, ceramics, polymers, and other materials, provides an economical method for treatment of metals to improve corrosion resistance, and allows better control of defects such as particulates in pulsed laser deposition (PLD).

BACKGROUND OF THE INVENTION

Materials processing using lasers has grown greatly in past decade. Materials processing consists of material removal steps such as drilling, cutting, as well as joining. The majority of lasers now used are CO2 or Nd:YAG lasers with continuous wave (CW) or long-pulsed (ms long pulses at 100s of Hz rates) temporal formats. The long-pulsed formats typically consists of millisecond pulse lengths at a frequency in the hundreds of Hz.

Laser machining consists of focusing laser light to ablate materials for the purpose of cutting a hole, slice, etc. Conventional laser machining methods typically exhibit several limitations, including the fact that a high laser fluence, typically greater than 10 joules/cm$^2$, is required in order to initiate the ablation. Conventional lasers typically cannot achieve these high levels of fluence. Additionally, conventional lasers typically adversely affect a larger portion of the target material than desired as a result of heat flowing out of the ablated zone and into the surrounding material. Additionally, the effectiveness of conventional laser machining is very dependent on the composition of the target material and the wavelength of light, which are typically not optimal for minimizing negative effects on the surrounding material.

Basic physics constraints on the stored energy per unit volume and gain sets the output of single-rod Nd:YAG lasers at about 1 kW, CO2 lasers at about 6 kW, and excimer lasers at a few hundred watts, which is inadequate for many machining processes. Since these conventional lasers can't be scaled to the output power (>10 kW) required in many machining applications, their use hasn't become prevalent. When a conventional laser is used to machine difficult to ablate materials, such as metals or ceramics, the high power levels required tend to create negative side effects, such as a large heat affected zone, cracks, or melted areas surrounding the machined area.

Applications of high average power lasers with outputs above 10 kW mainly fall into two categories: thermal processing or ablative processing. Thermal processing includes surface texturing, surface amorphization, laser glazing and annealing, adhesive bond pretreatment, crystallizing amorphous silicon, laser annealing, deposition, and cutting for photovoltaics, and solvent-free cleaning. Ablative processing includes micromachining, cutting and slitting, and deposition of large area thin films.

Prior art methods of micromachining metals include the use of continuous wave lasers. The CW lasers must heat the target material enough to create some surface transformation. In micromachining with CW lasers, such as creating holes in an aluminum surface, using an existing art CO$_2$ laser at a 6 kW average power level requires a great deal of time, perhaps 4 to 5 milliseconds, to achieve the desired surface transformation. An example may be the micromachining of the leading edge of an airplane wing to improve boundary layer characteristics. In this example, billions of tiny holes are machined on the leading edge of a wing. The machining time per hole with prior art laser systems is unacceptably large. Applications such as this require a much faster and more efficient micromachining method to do the job in a reasonable amount of time.

Machining applications therefore remain unexploited because they are best performed by a laser with an ultrashort pulse and high pulse repetition frequency (PRF) output with high average power. Ultrashort laser pulses are typically defined as short optical pulses in the femtosecond ($10^{-15}$ s) to picosecond ($10^{-12}$ s) range. What is needed is a laser system employing ultrashort pulses in the femtosecond (fs) to picosecond (ps) range at a PRF of 100 kHz to MHz range and at average power levels above 10 kW.

Applications of high power (above 10 kW) lasers fall into one of two categories: thermal processing or ablative processing. Conventional ultrafast (short-pulsed) lasers have not yet achieved high average power, and based on the nature of the amplification process, aren't likely to. Compelling reasons to use ultrafast lasers include: 1) a lower threshold for ablation, 2) more deterministic damage zone, 3) ablation with minimal creation of a heat-affected zone, 4) no cracking or melting, and 5) reduced time to create the desired machining effect. Along with a short-pulse time structure, other desirable properties of a high power laser are a high PRF (approximately 100 kHz to 300 MHz) and wavelength agility, so absorption bands (if present) in the material can be accessed. Basic physics constraints on the energy density achievable with lasers based on non-FEL methods means buying more lasers in order to increase the power available for a material processing procedure. Over and beyond space constraints, the complexity of then combining the output of these lasers and possibly synchronizing them as well comes into play.

U.S. Pat. No. 5,656,186 by Mourou, et al., issued Aug. 12, 1997 (hereinafter the '186 patent), discloses a method for laser-induced breakdown of a material with a pulsed laser beam in which the material is characterized by a relationship of fluence breakdown threshold versus laser beam pulse width that exhibits at least a clearly detectable and distinct change in slope at a predetermined laser pulse width value. The '186 patent proposes generating a beam of laser pulses focused to a point at or beneath the surface of the target material and wherein each pulse has a pulse width equal to or less than the predetermined laser pulse width value. In employing the method of the '186 patent to ablate silver film on glass, a Ti:Sapphire laser generated pulse widths of 7 ns to 100 fs at 800 nm wavelength, a frequency of 1 kHz, a spot size of 3.0 µm diameter, and a fluence of 0.4 joules/cm$^2$. The method of the '186 patent is, however, limited in its usefulness for machining materials such as metals and ceramics. Although the Ti:Sapphire laser of the '186 patent can deliver short pulses, it does not permit the high average power levels that are required to adequately machine these materials. This has limited the adoption of conventional lasers for machining these types of materials.

As shown by the above discussion, there is a need for laser machining of materials that exhibits a lower threshold for ablation, more deterministic damage, ablation with minimal heat-affected zone in metals, no cracking or melting, and reduced time to create the desired machining effect, the desired surface treatment, or the desired pulsed laser deposition of material.

OBJECTS OF THE INVENTION

It is therefore an object of the present invention to provide a laser machining system in which 1) ablation is stimulated at a lower power threshold, 2) the damage zone is more controllable, 3) the heat affected zone is minimal, 4) cracking and melting is avoided, and 5) the time is greatly reduced.

These, and other advantages of the machining method of the present invention will become readily apparent to one of skill in the art after reading the attached description and with reference to the attached drawings and appended claims.

BRIEF DESCRIPTION OF THE INVENTION

The present invention combines the benefits of an ultrashort pulse laser at high average power with a continuous wave laser. An initial pulse would be provided by a laser with an ultrashort pulse duration of between 100 and 600 femtoseconds at a fluence of 0.5 $J/cm^2$ or greater focused on the target. Simultaneous to or shortly after this pulse, a pulse from a continuous wave laser with a pulse length of between 100 nanoseconds and 1 microsecond and at a fluence of 1 $J/cm^2$ would also be applied to the target. The second laser pulse would sustain and enlarge on the ablation effect launched in the initial pulse. The pulse pairs are repeated as often as desired to produce the desired micromachining effect. The ultrashort pulses may be supplied by a titanium sapphire laser at 1 millijoule and 1.0 micron wavelength or by an FEL at 100 microjoules and 0.3 micron wavelength. The continuous wave laser may be a $CO_2$ laser at 1 joule and 10.6 microns wavelength or by a Nd:YAG laser at 1 joule and 1.06 micron wavelength. Many other laser configurations are possible to achieve the desired criteria of an initial ultrashort pulse to ignite the ablation followed by a longer pulse to sustain the machining action.

REFERENCE NUMERALS USED IN THE SPECIFICATION AND DRAWINGS

Figure 1:
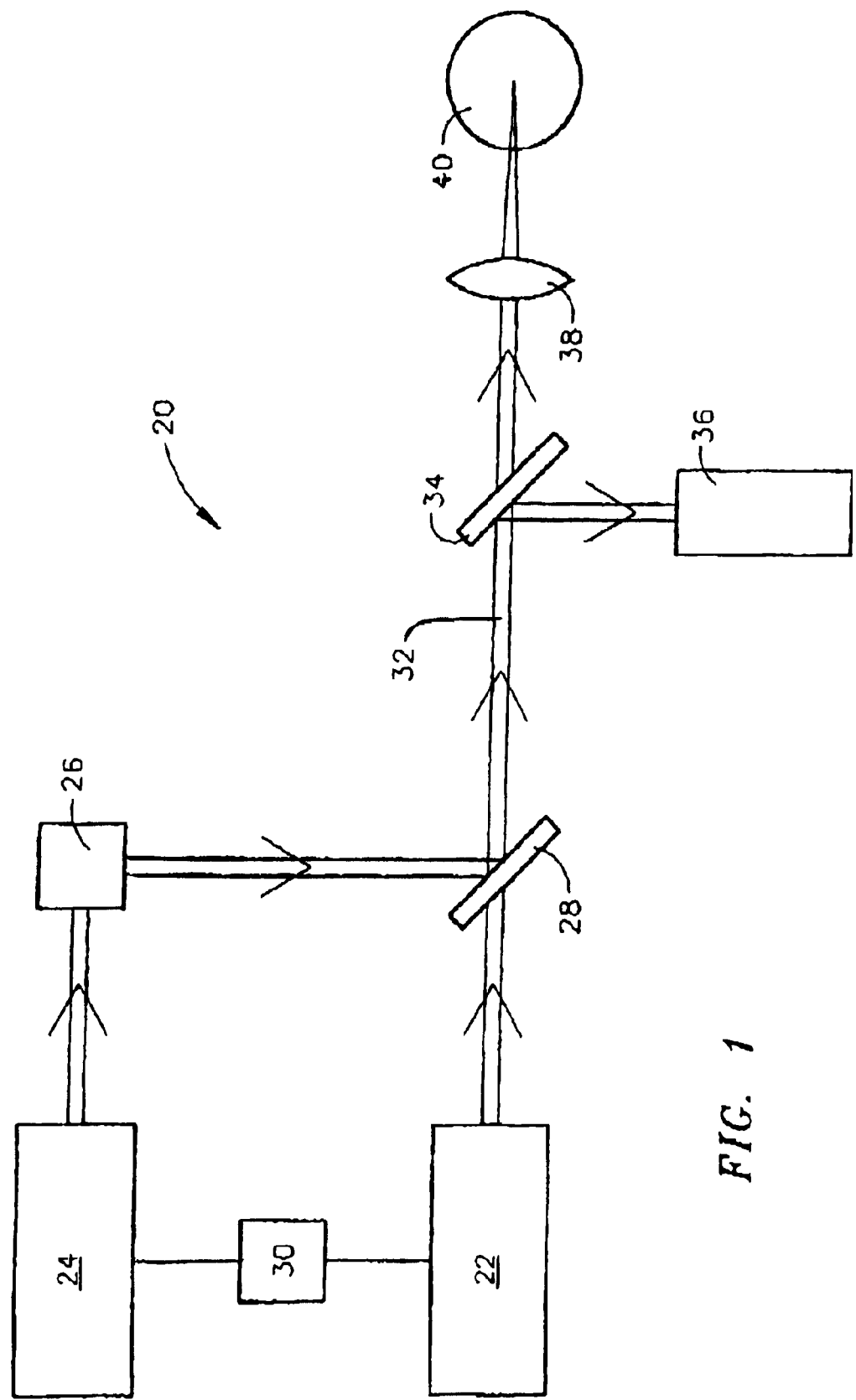
FIG. 1 is a schematic of one setup of the present invention.

20—laser machining system
22—pulsed laser
24—continuous wave laser
26—laser beam steering system
28—beam combiner optic
30—timing controller
32—laser beam
34—beam splitter optic
36—photodetector light sensor
38—focusing lens
40—target

DETAILED DESCRIPTION

With reference to the attached drawings, it should be noted that the figure is representative and exemplary of a single example only, and should not be construed as limiting the scope of the invention in any way.

The present invention combines an ultrashort pulse laser with a longer pulse laser. In essence the ultrashort pulse laser serves as an ignitor for the high, materials-independent absorption. The short pulses cause the electron avalanche to occur while the longer pulse delivers the energy that does the work. Once initiated, the electron avalanche continues to have beneficial effects including high energy absorption, more deterministic interactions, minimized heat-affected zones, no cracking or melting, and reduced time to create a desired machining effect.

Referring to FIG. 1, a schematic is shown of one possible setup of a laser machining system 20 for the laser machining and surface treatment of materials. The system includes a pulsed laser 22 and a continuous wave laser 24. A laser beam steering mechanism 26 redirects the path of the continuous wave laser 24 and directs it to a beam combining optic 28 wherein the two beams are diverged onto the same path. A timing controller 30 provides a means of adjusting the delay between the timing of the first pulse with respect to the second pulse. The timing controller 30 provides a means of setting the delay from zero to several microseconds. After being diverged onto the same path, the laser beam 32 is split by a beam splitter 34 with a minor portion of the beam deflected into a photodetector light sensor 36. The photodetector light sensor 36 provides a means of measuring the laser output and calibrating the system. The majority of the laser beam 32 is transmitted to a focusing lens 38 that concentrates the laser pulses onto a target 40.

A first example of the present invention would include a Ti:Sapphire laser for supplying ultrashort laser pulses and a $CO_2$ laser for supplying long pulses. The initial 1 millijoule pulse would be provided by the Ti:Sapphire laser at 1.0 micron wavelength with a pulse duration of 100 fs and at a fluence of 0.5 $J/cm^2$ or greater. This would lead to ablation of the target material. Simultaneous to or shortly subsequent to the first pulse, the pulse from a $CO_2$ laser at a 10.6 micron wavelength is applied. This pulse would have an energy of 1 joule over a pulse length of 100 nanoseconds and be focused to a fluence of 1 joule/cm2. The ultrashort pulses would be repeated at a PRF of between 100 kHz to several hundred MHz. The pulse pairs would be sustained as long as required to produce the desired machining effect. The long pulse $CO_2$ laser would therefore sustain and enlarge upon the ablation effect launched in the initial pulse from the Ti:Sapphire laser.

A second example of the present invention includes a free electron laser (FEL) supplying the ultrashort pulses and a Nd:YAG laser supplying the long pulses. The FEL would supply a 100 microjoule pulse at 0.3 micron wavelength with a pulse length of 600 fs focused to a fluence of 0.5 $J/cm^2$ or greater. Simultaneous to the FEL pulse or shortly after it, a pulse would be supplied from a Nd:YAG laser operating at an energy of 1 joule, at a wavelength of 1.06 microns, a pulse length of 1 microsecond, and focused to a fluence of 1 $J/cm^2$ or greater. The ultrashort pulses would be repeated at a PRF of between 100 kHz to several hundred MHz. Again, the pulse pairs would be sustained as long as required to produce the desired machining effect with the long pulse Nd:YAG laser sustaining and enlarging upon the ablation effect launched in the initial pulse from the FEL.

It should be emphasized that the above cited examples are only two of many possible configurations satisfying the criteria of an initial short pulse to ignite the ablation followed by a longer pulse to sustain the machining action.

So therefore, while the invention has been described by reference to the preferred embodiment disclosed herein, the invention is subject to considerable modification and may be tailored to fit the needs of many micromachining applications without departing from the scope or spirit of the claims, which are appended hereto.

What is claimed is:

1. A process for laser machining or surface treatment, comprising:
   a first laser providing an ultrashort pulse at a pulse repetition frequency between 100 kHz and 300 MHz;
   a second laser providing a long pulse timed to arrive at a target simultaneous to or at a short time delay after said ultrashort pulse;
   a control system for controlling said time delay between said ultrashort pulse and said long pulse; and
   optics for focusing said ultrashort pulse and said long pulse onto a target.

2. The process for laser machining or surface treatment of claim 1 wherein said ultrashort pulse has a pulse length in the femtosecond ($10^{-15}$ s) to picosecond ($10^{-12}$ s) range.

3. The process for laser machining or surface treatment of claim 1 wherein said long pulse has a pulse length in the range of 100 nanoseconds to 1 microsecond.

4. The process for laser machining or surface treatment of claim 1 wherein said first laser is a Ti:Sapphire laser and said ultrashort pulse has a pulse energy of at least 1 millijoule, a wavelength of 1.0 micron, and a fluence of at least 0.5 joule/cm$^2$.

5. The process for laser machining or surface treatment of claim 1 wherein said first laser is a free electron laser and said ultrashort has a pulse energy of at least 100 microjoules, a wavelength of 0.3 micron, and a fluence of at least 0.5 joule/cm$^2$.

6. The process for laser machining or surface treatment of claim 1 wherein said second laser is a CO2 laser and said long pulse has a pulse energy of at least 1 joule, a wavelength of 10.6 microns, and a fluence of at least 1.0 joule/cm$^2$.

7. The process for laser machining or surface treatment of claim 1 wherein said second laser is a Nd:YAG laser and said long pulse has a pulse energy of at least 1 joule, a wavelength of 1.06 microns, and a fluence of at least 1.0 joule/cm$^2$.

8. The process for laser machining or surface treatment of claim 1 wherein said first laser is a free electron laser in which the wavelength may be adjusted between 0.2 and 14.0 microns.

9. The process for laser machining or surface treatment of claim 1 wherein said time delay between said short pulse and said long pulse is between 0 and 1 microsecond.

10. The process for laser machining or surface treatment of claim 4 wherein the pulse length is 100 femtoseconds.

11. The process for laser machining or surface treatment of claim 5 wherein the pulse length is 600 femtoseconds.

12. The process for laser machining or surface treatment of claim 6 wherein the pulse length is 100 nanoseconds.

13. The process for laser machining or surface treatment of claim 7 wherein the pulse length is 1 microsecond.

14. The process for laser machining or surface treatment of claim 4 wherein the pulse length is 100 femtoseconds.

15. The process for laser machining or surface treatment of claim 5 wherein the pulse repetition frequency is between 18 and 75 MHz.

16. A method for laser machining and surface treatment comprising the steps of:
   providing a first laser supplying an ultrashort pulse having a pulse length in the femtosecond ($10^{-15}$ s) to picosecond ($10^{-12}$ s) range, a fluence of 0.5 J/cm$^2$ or greater, a pulse energy of at least 1 millijoule, and a wavelength between 0.2 and 14 microns;
   providing a second laser supplying a long pulse having a pulse length in the range of 100 nanoseconds to 1 microsecond, a fluence of 1.0 J/cm$^2$ or greater, a pulse energy of at least 1 joule, and a wavelength between 1.06 and 10.6 microns;
   providing optics for focusing said ultrashort and said long pulses onto a target;
   providing a control system for controlling the timing of said ultrashort and long pulses;
   firing said ultrashort pulse at a target;
   firing said long pulse at the target simultaneous to or at a short time delay after said ultrashort pulse with said time delay between 0 and 1 microsecond; and
   repeating said ultrashort pulse and said long pulse separated by said time delay at a pulse repetition frequency between 100 kHz and 300 MHz until said laser machining or said surface treatment is completed.

17. A process for laser machining or surface treatment, comprising:
   a first laser providing an ultrashort pulse at a pulse repetition frequency between 100 kHz and 300 MHz, a pulse duration between 100 and 600 femtoseconds, a wavelength between 0.3 and 1.0 microns, and a fluence of at least 0.5 J/cm$^2$;
   a second laser providing a long pulse timed to arrive at a target simultaneous to or at a short time delay of up to 1 microsecond after said ultrashort pulse;
   said long pulse having a pulse duration between 100 nanoseconds and 1 microsecond, a wavelength between 1.06 and 10.6 microns, and a fluence of at least 1 J/cm$^2$;
   a control system for coordinating said time delay between said ultrashort pulse and said long pulse; and
   optics for focusing said ultrashort pulse and said long pulse onto a target.

18. The process for laser machining or surface treatment of claim 17 wherein said first laser is a Ti:Sapphire laser and said ultrashort pulse has a pulse energy of at least 1 millijoule.

19. The process for laser machining or surface treatment of claim 17 wherein said first laser is a free electron laser and said ultrashort pulse has a pulse energy of at least 100 microjoules.

* * * * *